United States Patent [19]

Muller

[11] 4,001,552

[45] Jan. 4, 1977

[54] METHOD AND APPARATUS FOR MEASURING WEB MATERIAL WOUND ON A REEL

[75] Inventor: Ronald M. Muller, Brandywine, Md.

[73] Assignee: The United States of America as represented by the Administrator of the National Aeronautics and Space Administration, Washington, D.C.

[22] Filed: Apr. 4, 1975

[21] Appl. No.: 565,289

[52] U.S. Cl. .................. 235/92 DN; 235/92 CA; 235/92 CT; 235/92 R
[51] Int. Cl.² ..................................... H03K 21/18
[58] Field of Search ..... 235/92 DN, 92 CA, 92 CT, 235/92 PE, 92 EV, 92 MS, 92 MT, 92 MP

[56] References Cited

UNITED STATES PATENTS

| | | | |
|---|---|---|---|
| 3,538,729 | 11/1970 | Sterrett, Jr. .................. | 235/92 DN |
| 3,564,219 | 2/1971 | Mutziger ....................... | 235/92 PE |
| 3,710,084 | 1/1973 | Slagley et al. ................ | 235/92 DN |
| 3,739,276 | 6/1973 | Dornberger ................... | 235/92 R |
| 3,824,694 | 7/1974 | Lesperance et al. ......... | 235/92 PE |
| 3,834,648 | 9/1974 | Rose, Jr. et al. ............. | 235/92 CT |
| 3,898,436 | 8/1975 | Pottebaum et al. .......... | 235/92 CA |

Primary Examiner—Gareth D. Shaw
Assistant Examiner—John P. Vandenburg
Attorney, Agent, or Firm—Ronald F. Sandler; Robert D. Marchant; John R. Manning

[57] ABSTRACT

Method and apparatus for measuring the number of layers of a web material of known thickness wound on a storage or take-up reel. The method and apparatus are based on the principle that, at a relatively large radius, the loci of layers of a thin web wound on the reel approximate a family of concentric circles having radii respectively successively increasing by a length equal to the web thickness, $t$, whereby the difference in circumferences between adjacent web layers is substantially constant and equal to $2\pi t$. Tachometer pulses are generated in response to linear movement of the web and reset pulses are generated in response to rotation of the reel. The tachometer pulses, either prerecorded on a track of the web or generated by a code wheel rotating with the moving web, are spaced apart from each other by $2\pi t$. With that spacing, each layer of the web contains one pulse more than an immediately preceding layer. A digital circuit, responsive to the tachometer and reset pulses, generates data indicative of the layer number of any layer of the web and of position of the web within the layer without requiring numerical interpolation.

17 Claims, 8 Drawing Figures

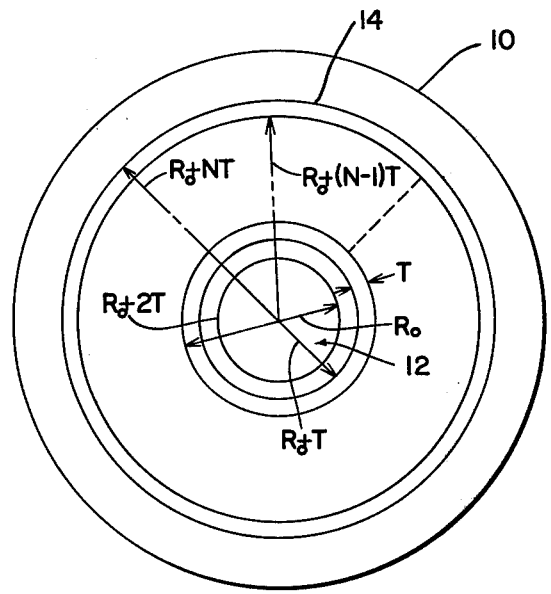
FIG. 1
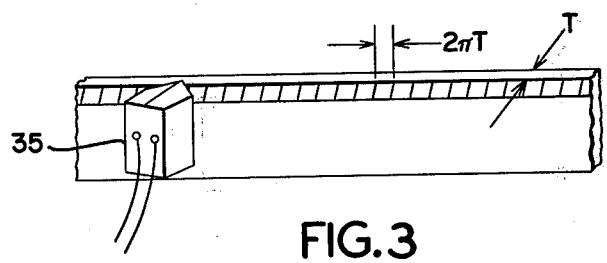
FIG. 3
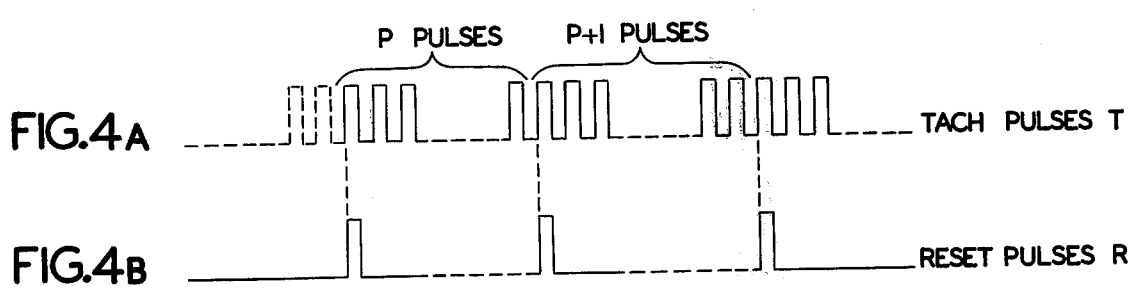
FIG. 4A
FIG. 4B

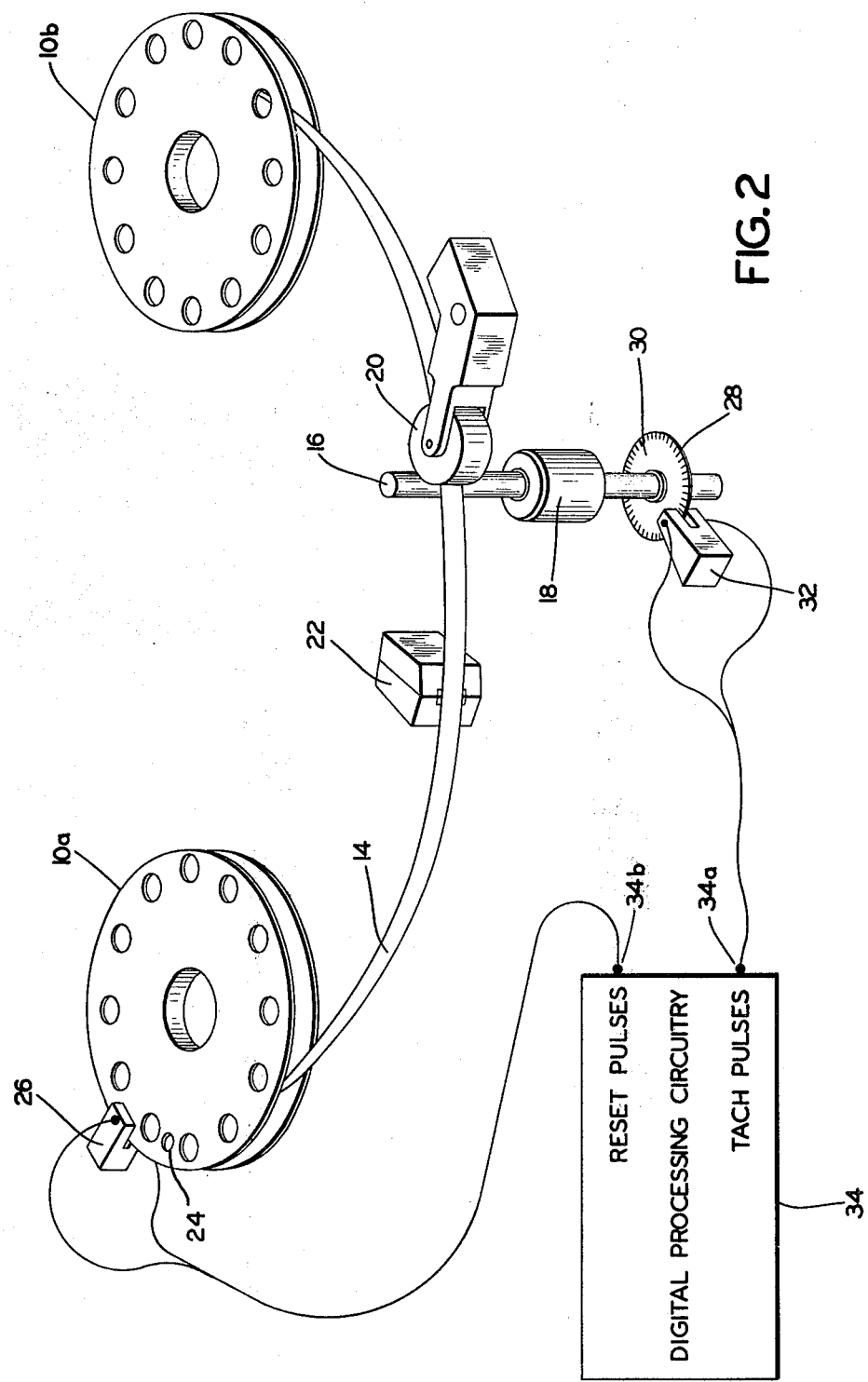

METHOD AND APPARATUS FOR MEASURING WEB MATERIAL WOUND ON A REEL

ORIGIN OF THE INVENTION

The invention described herein was made by an employee of the United States Government and may be manufactured and used by or for the Government for governmental purposes without payment of any royalties thereon or therefor.

FIELD OF THE INVENTION

The present invention relates generally to a device for measuring the number of layers of web wound on a reel, and more particularly to a device for indicating the layer number and web position of a thin web wound on a reel without physically contacting the reel or requiring numerical interpolation.

BACKGROUND OF THE INVENTION

Prior apparatus for indicating the layer number of a web material wound on a reel include mechanisms such as a mechanical counter, geared to the reel for directly monitoring the turn number of the reel. However, mechanical counters produce mechanical loading on the reel, are inaccurate, and tend to wear out.

Prior attempts have been made to provide an indication of quantity, as opposed to layer number, of a web material wound on a reel without mechanically contacting the reel. In U.S. Pat. No. 3,564,219 to Metzeger, there is disclosed an electronic indicator for indicating the amount of a web material would upon a spool by generating a first train of pulses as a function of the rotational velocity of the reel, and a second train of pulses as a function of the linear velocity of the web material. As the web is wound onto or unwound from the reel, the rate at which the reel rotates varies in proportion to the amount of the web material wound thereon. Accordingly, by monitoring the number of web responsive pulses relative to the reel responsive pulses, an indication of the radius of the total web material accumulated on the reel can be ascertained. The actual layer number of web material wound on the reel, however, is not available. This is because the output of the Mutziger device is a function of only the radius of web accumulated on the reel. It can detect what proportion of the reel contains web, e.g., that the reel is 50 percent full, but not the actual number of layers of the web wound thereon. The actual layer number of the web can be derived only by measuring (a) the circumference of the outermost layer of web on a full reel, (b) the circumference of the reel hub, (c) the length of tape corresponding to a full reel, and (d) the circumference of the unknown layer and then numerically interpolating the circumference of the unknown layer to derive the layer number of the unknown layer of web wound on the reel. The numerical interpolation requires mental steps or complex electronic circuitry and is impractical for low cost, automatic systems.

As another disadvantage, the Mutziger device, providing only data indicative of amount of web wound on a reel, rather than layer number, is unsuitable for data addressing wherein data carrying web, such as magnetic tape, is first unwound from a storage reel to a predetermined layer of the web and then to a predetermined position within the layer.

OBJECTS OF THE INVENTION

Accordingly, it is one object of the present invention to provide a new and improved method and apparatus for indicating the number of layers of a web material wound on a reel.

It is another object of the present invention to provide a new and improved method and apparatus for indicating the number of layers of a web material wound on a reel without physically contacting the reel.

It is another object of the present invention to provide a new and improved method and apparatus for indicating the number of layers of a web material wound on a reel by measuring the circumference of only the outermost layer of web.

It is another object of the present invention to provide a method and apparatus for indicating the number of layers of a web material wound on a reel without requiring interpolation.

SUMMARY OF THE INVENTION

The method and apparatus of the present invention are based on the principle that, for relatively large radii, the loci of the layers of a thin web material wound on a reel approximate a family of concentric circles having radii respectively successively increasing by the thickness t of the web material. Thus, for large radii, the difference in circumferences between adjacent web layers is substantially constant and equal to $2\pi t$.

Reset pulses are synchronized to rotation of a storage or take-up reel, and tachometer pulses are synchronized to linear movement of a web as it is wound onto or unwound from the reel. One reset pulse is generated for each turn of the reel and one tachometer pulse is generated for $2\pi t$ segment of the web. Since the difference in circumferences between adjacent web layers is $2\pi t$, each layer of web, extending outwardly from the hub of the reel, causes one more tachometer pulse to be generated than does an immediately preceding layer. By monitoring the number of tachometer pulses generated during each complete turn of the reel, determined by the reset pulses, and subtracting from that number a fixed number corresponding to the circumference of the hub of the reel, the resultant number is the number of layers of the web wound on the reel.

According to one embodiment, tachometer markings are spaced apart by $2\pi t$ on the periphery of a code wheel connected to a capstan. As the capstan rotates with linear movement of the web, the markings on the code wheel are converted into the tachometer pulses by a transducer.

In another embodiment, the tachometer pulses, spaced apart by $2\pi t$, are pre-recorded on an unused track of the recording web and detected by a magnetic pick-up.

The reset and tachometer pulses are supplied to a digital circuit that derives the layer number of the web and position of the web within the layer. The digital circuit comprises a count down counter circuit, a pair of count up counter circuits, and control logic. The count down counter and a first count up counter monitor layer number, while the second count up counter functions as a venier to monitor position of the web within each layer. The count down counter circuit is preset to a fixed number corresponding to the circumference of the hub of the reel. Tachometer pulses generated in response to linear web movement are supplied to the count down counter circuit; the input of the first count up counter circuit is initially blocked by the control logic but the second count up counter receives the pulses continuously. When the count down counter circuit counts down to zero, the control logic supplies tachometer pulses to the first count up counter circuit. Each reset pulse, indicative of the completion of a full turn of the reel, causes the output of the first count up counter circuit to be stored in a register and causes the count down and both count up counter circuits to be reset. The binary number stored in the register is equal to the layer number of the outermost layer of web on the reel without interpolation. The outputs of both count up counter circuits are continuously monitored to provide web position within each layer.

The output data can be used for indicating the number of layers and position within each layer of the web wound on the reel, or to address data stored in the web. The latter is performed with a digital comparator that compares the layer number and position data with corresponding preselected data. The output of the comparator controls a servo for driving the reel.

The above and still further objects, features and advantages of the present invention will become apparent upon consideration of the following detailed description of several specific embodiments thereof, especially when taken in conjunction with the accompanying drawing.

BRIEF DESCRIPTION OF THE DRAWING

FIG. 1 is a diagrammatic representation of a reel, having web material wound thereon, for illustrating normal web winding components necessary for operating the present invention;

FIG. 2 is a partial perspective view of one embodiment of the present invention;

FIG. 3 is a partial perspective view of another embodiment of the present invention;

FIGS. 4a and 4b are illustrations of typical waveforms generated by the invention;

FIG. 5b is a diagram of one aspect of the circuit of FIG. 5a; and

DETAILED DESCRIPTION OF THE DRAWING

Figure 5A:
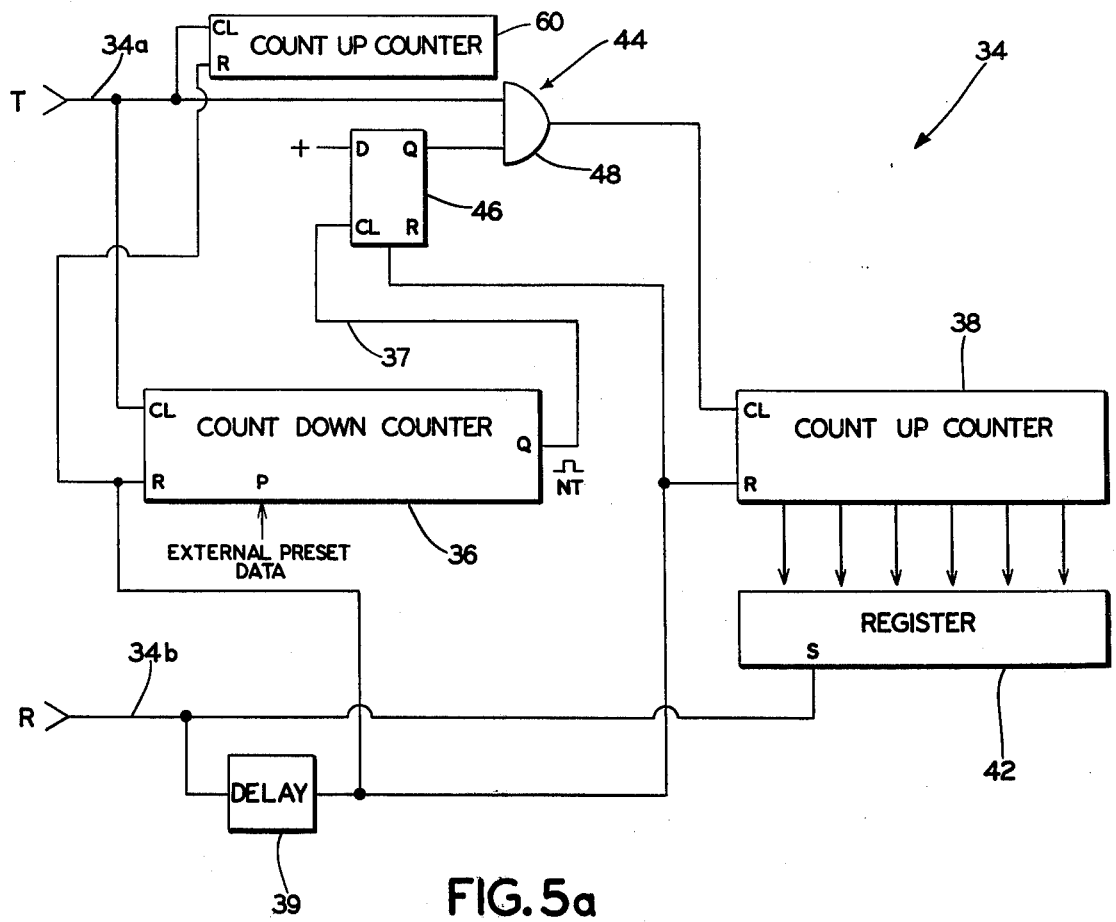
FIG. 5a is a schematic representation of a digital circuit utilized in the present invention.

Reference is now made to FIG. 1, wherein a reel 10 having an inner hub 12 has wound thereon a thin, flexible web material 14. Preferably, web material 14 comprises a tape coated with a magnetic material for magnetic recording; however, it is understood that the present invention is not limited to any particular web material.

It is well known that the locus of points of a thin, flexible web material wound on a reel is an Archimedes spiral with successive layers of the web overlying each other outwardly from the hub. I have found that for relatively large radii, the loci of the layers of thin web closely approximate a family of concentric circles with the radii thereof respectively successively increasing by the thickness $t$ of the web. The radius $R_N$ of an nth layer of web is given by the formula $$R_N = R_o + Nt \qquad (1)$$

where:

$R_o$ is the radius of hub 12;

$N$ is the layer number of the web; and $t$ is the thickness of the web material.

For example, referring to FIG. 1 where the radius of hub 12 is $R_o$, the radius of the outer surface of the first layer of web is $R_o + t$ and the radius of the outer surface of the second layer of web is $R_o + 2t$. Since the loci of the web layers more closely approximate concentric circles for relatively large radii, Equation (1) is more accurate for the outermost layers of web 14 on reel 10 than for the layers near hub 12. However, where $R_o \gg t$, I have found that Equation (1) is accurate enough to satisfy the requirements of most layer count or data address applications.

The circumference $C_N$ of each layer of web 14 is described by the following equation:

$$C_N = 2\pi(R_o + Nt) \qquad (2)$$

The difference $D_n$ in circumferences between the circumference of an Nth layer of web 14 and that of hub 12 can be derived by subtracting Equation (1) from Equation (2).

$$D_N = 2\pi Nt \qquad (3)$$

Solving Equation (3) for layer number N:

$$N = D_N/2\pi t \qquad (4)$$

If we set $D_N = K2\pi t$, where $K$ is an integer constant, Equation (4) reduces to $$N = K \qquad (5)$$

Accordingly, by measuring the length of the circumference of each layer of web as an integral multiple of the factor $2\pi t$, layer number of the web as an integral multiple of $2\pi t$ can be measured directly, i.e., without numerical interpolation. Thus, according to the invention, the circumference of each layer of web 14 is measured as an integral multiple of $2\pi t$, and the measured circumference is digitally processed to provide direct measurement of web layer number.

Referring to FIG. 2, there is illustrated a simplified perspective view of one embodiment of the present invention. Web 14 is wound on storage reel 10a and take-up reel 10b. Web 14 is driven linearly by capstan 16 which is rotated by motor 18. Reels 10a and 10b are also rotated by at least one additional motor (not shown) and suitable coupling such as pulleys. Pressure roller 20 is spring biased against capstan 16 to prevent web 14 from slipping during operation. A conventional magnetic pickup 22 converts data recorded on web 14 into an electrical signal.

An aperture 24 is provided on the periphery of storage reel 10a. Transducer 26, such as a lamp and photocell unit, is positioned at the periphery of storage reel 10a in view of aperture 24 passing therethrough during each turn of the storage reel. The transducer 26 generates a reset pulse R for each complete turn of reel 10a. Reset pulses R are supplied to input 34b of digital processing circuitry 34. Preferably, a pulse shaping network (not shown), such as a Schmidt trigger, is provided at input 34b to eliminate the effect of noise on reset pulses R.

A code wheel 28 having tachometer markings 30 spaced around the periphery thereof is connected to one end of capstan 16 for rotation therewith. The markings 30, which could be provided in any suitable format such as apertures or light reflecting or magnetic markings, are sensed by a suitable transducer 32, such as a lamp and photocell unit, and converted into the electrical tachometer pulses T. The tachometer pulses T are supplied to input 34a of digital circuitry 34. Again, a pulse shaping network (not shown) is preferably provided at input 34a.

Tachometer markings T are spaced apart from each other on code wheel 28 by a fixed distance such that when the capstan passes $2\pi t$ length of webb, one tachometer pulse is generated, where $t$ is the thickness of web 14. For example, if capstan 16 and code wheel 28 each has a radius of 1 inch, 1,000 markings are equally spaced apart on the periphery of the code wheel and one pulse is generated for each $2\pi$ mils segment (0.00628 inch) of web 14 driven by capstan 16.

In operation, tachometer pulses T are generated by transducer 32 as capstan 16 drives web 14 from storage reel 10a to take-up reel 10b. Motor 18 is a constant speed motor that rotates capstan 16 at a constant speed that is independent of the amount of tape wound on storage reel 10a whereby the repetition rate of tachometer pulses T is constant. On the other hand, storage reel 10a rotates at a speed which is a function of the amount of web that is wound thereon, i.e., at a slower speed when the reel is nearly full than it does when the reel is nearly empty. Thus, the repetition rate of reset pulses R relative to that of tachometer pulses T is a function of the numbers of layers of web 14 wound on reel 10a. Although a constant speed motor is shown in the preferred embodiment, it is understood that, since relative pulse repetition rate, rather than absolute rate are used, motor 18 does not have to be a constant speed motor in the present invention.

The relationship between tachometer pulses T and reset pulses R will become clear with reference to FIGS. 4A and 4B. In FIG. 4B, reset pulses R are generated in response to aperture 24 passing through transducer 26. The time duration between successive reset pulses R is variable and corresponds to one complete turn of storage reel 10a. In FIG. 4A, tachometer pulses T, generated by transducer 32 in response to markings 30 on code disc 28, have a constant repetition rate that is fixed by the spacing of the markings and the speed of rotation of capstan 16. Since the circumferences of successive layers of web 14, extending outwardly from hub 12, increase respectively by $2\pi t$, and a tachometer pulse is generated for each $2\pi t$ segment of web driven by capstan 16, it is clear that each successive layer of web contains one tachometer pulse more than an immediately preceding layer of web.

The waveforms shown in FIGS. 4A and 4B correspond to those generated during winding or unwinding of any two adjacent layers of web 14. P tachometer pulses corresponding to an Nth web layer are generated during one full turn of reel 10a (between the first and second reset pulses R in FIG. 4B), and (P + 1) pulses are generated during the next full turn of reel 10a (between the second and third reset pulses R in FIG. 4B). Since each layer of web 14 wound onto reel 10a contains one tachometer pulse more than the immediately previously wound layer, it is apparent that by monitoring the number of reset pulses R generated by transducer 32 during each turn of reel 10a, and subtracting therefrom a fixed number corresponding to the circumference of hub 12, the resultant number represents the layer number of the web without numerical interpolation.

It is to be understood that, besides using code wheel 28 connected to capstan 16 as shown in FIG. 2, tachometer pulses T can be generated by any other means synchronized to linear movement of web 14. For example, code wheel 28 can be coupled with a suitable pulley coupling to any guide element which contacts the moving web.

As another preferred embodiment, the tachometer pulses, spaced apart from each other by $2\pi t$, may be pre-recorded along the length of an unused track of web 14 as shown in FIG. 3. The pre-recorded pulses T are converted into electrical pulses by a conventional magnetic pick-up 35. Obviously, pick-up 35 in FIG. 3 may be combined with pick-up 22 in FIG. 2 to form a single unit.

As mentioned supra, tachometer pulses T and reset pulses R are respectively supplied to inputs 34a and 34b of digital processing circuit 34, that is illustrated in more detail in FIG. 5A. Circuit 34 comprises count down counter circuit 36, count up counter circuit 38, storage register 42, control logic 44 and an optional count up counter circuit 60. Counter circuits 36, 38 and 60 each includes a clock input CL and reset input R. Count down counter circuit 36, which may be an R.C.A. 4059 integrated circuit, is externally preset to the number of tachometer pulses corresponding to the circumference of hub 12. When a reset pulse is supplied to terminal R of count down counter 36, the counter becomes preset to the externally preset data supplied in bit parallel to input P. Pulses supplied to clock terminal CL cause counter 36 to count down toward the number zero. When count down counter 36 reaches zero, a single pulse NT is generated from output terminal Q of counter 36.

When a reset pulse R is supplied to reset terminal R of count up counter 38 or 60, the parallel output bits of the counters become preset to zero. Tachometer pulses supplied to clock terminal CL cause count up counters 38 and 60 to count up from zero. The parallel output bits of count up counter 38 are supplied to storage register 42. The parallel output bits of counter 60, when combined with the output of counter 38, are available as a venier output of circuit 34. When a reset pulse R is supplied to strobe terminal S of register 42, the data at the input of the register at the time of application of the reset pulses are stored therein. Count up counters 38 and 60 may each be an R.C.A. 4020 integrated circuit and registers 42 may be a TI SN 74199, by way of example.

Control logic 44 comprises a D-type flip-flop 46 and an AND gate 48. The D-type flip-flop 46 is conventional and includes inputs D, CL and R, and an output Q. The D input of flip-flop 46 is connected to a fixed logic 1 source. Thus, when a pulse is supplied to the CL input of flip-flop 46, the signal at output Q goes to logic 1; when a pulse is supplied to input R, the signal at output Q goes to logic 0.

Assuming that the circuit 34 initially receives a reset pulse R, the operation of circuit 34 is as follows:

In response to the reset pulse R, count down counter 36 is preset to the number of tachometer pulses corresponding to the circumference of hub 12, count up counters 36 and 60 are preset to zero, register 42 is loaded with a number previously transferred thereto from count up counter 38, assumed for the present example to be zero, and output Q of flip-flop 46 is a logic zero. Tachometer pulses T are supplied directly to clock inputs CL of count down counter 36 and count up counter 60. Counter 60 begins accumulating counts in response to tachometer pulses T. Tachometer pulses T are isolated from input CL of count up counter 38 by gate 48 because an input of gate 48, connected to output Q of flip-flop 46, is at logic zero.

In response to tachometer pulses T, count down counter 36 counts from the preset number down toward zero. When the output of count down counter 36 reaches zero, it generates a pulse NT along line 37 to input CL of flip-flop 46. Pulse NT causes the signal at output Q of flip-flop 46 to change from logic 0 to logic 1. The logic 1 signal applied to one input of gate 48 permits tachometer pulses T to pass through the other input of the gate to clock input CL of count up counter 38.

Thus, count up counter 38, controlled by count down counter 36 and logic control 44, is inhibited from counting until the circumference of a monitored layer of web 14 has exceeded the circumference of hub 12. Then count up counter 38, responsive to tachometer pulses T, counts up toward the maximum count thereof. The maximum count of count up counter 38 is larger than the expected maximum number of tachometer pulses T applied thereto. The maximum number is equal to the difference between the number of tachometer pulses T corresponding to the circumference of the outermost layer of web 14, and the number preset in count down counter 36. When a second reset pulse R is generated by transducer 26 in response to aperture 24 indicative of a completed turn of storage reel 10a, register 42, responsive to reset pulse R applied to strobe terminal S, stores in bit parallel the count accumulated in count up counter 38. After a short delay time, count down counter 36, count up counter 38 and flip-flop 46 receive the reset pulse R. The delay time is provided by a conventional delay circuit 39 and is necessary to insure that register 42 stores the output of count up counter 38 before the count up counter is reset.

The number stored in register 42 is a direct count of the layer number of web 14 wound on reel 10. For example, again assuming that web 14 is one mil thick, a tachometer pulse T is generated for each 6.28 mil segment of web driven by capstan 16. Assuming also that the circumference of hub 12 is $2\pi$ inches (6,280 mils), corresponding to 1000 tachometer pulses, count down counter is externally preset to the count 1000. After generation of a first reset pulse R by transducer 32, count down counter 36 begins counting down from the number 1000 and generates pulse NT when it reaches the number 0. Count up counter 38 now begins up-counting until another reset pulse R is generated by transducer 32. The count accumulated in count up counter 38 is then stored in register 42. If, for example, the circumference of the measured layer of web corresponds to 1500 tachometer pulses, the difference between the number 1500 and the number 1000, or 500, is stored in register 42. Accordingly, the measured layer of web 14 is the 500th layer.

Figure 5B:
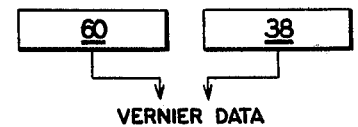

Read out of venier data, i.e., the position of the web within the measured layer number is provided directly by the optional count up counter circuit 60. Count up counter 60 accumulates counts continuously between reset pulses R. Obviously, count up counter 60 has a maximum count capacity that is greater than the capacity of count up counter 38 since the clock input CL receives tachometer pulses continuously until it is reset by a reset pulse R. As seen in FIG. 5B, the output of counter 60 is combined with the output of counter 38 to supply continuous venier data. The venier data have a resolution of $2\pi t$ within each layer of web 14.

Figure 6:
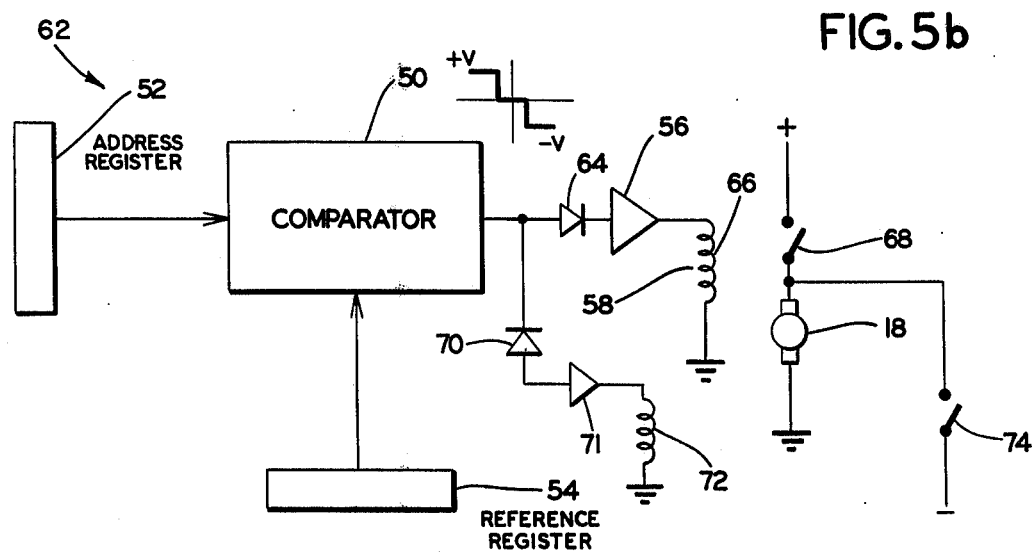
FIG. 6 is a simplified block diagram utilized in one embodiment of the present invention.

As aforementioned, the present invention can be used both for displaying web layer number and web position data, and for addressing a predetermined layer of web 14 and position therein. Referring to FIG. 6, a simplified block diagram of a web address system for addressing a predetermined layer number according to the present invention, is illustrated. Control system 62 comprises a comparator 50 having inputs connected respectively to address register 52 and reference register 54. Data stored in reference register 54 are representative of a desired layer number and position of web 14; data stored in address register 52 are the measured data generated by register 42 in FIG. 5A. Comparator 50 is a conventional digital comparator having a three-state output, i.e., when the number stored in register 52 is larger than that stored in register 54, the output of the comparator is at +V where V is typically 5 volts; when the numbers stored in registers 52 and 54 are equal, the output of the comparator is at 0; and when the number in register 52 is smaller than that in register 54, the output of the comparator is at −V.

When the output of comparator 50 is at +V, diode 64 conducts and diode 70 blocks current generated by comparator 50. Current passing through the diode 64 is amplified in buffer amplifier 56 to energize relay coil 66. The current in relay coil 66 produces a magnetic flux causing a pair of relay contacts 68 to close thereby energizing reel motor 18 in one direction, e.g., clockwise. When the output of comparator 50 is at −V, only diode 70 conducts thereby energizing relay coil 72 through buffer amplifier 71. The magnetic flux produced by coil 72 closes a pair of relay contacts 74 to drive motor 18 in the opposite direction, e.g., counterclockwise. When the output of comparator 50 is at 0, the address and reference data are identical indicating that the web is located at the desired position whereby both pairs of relay contacts 68 and 74 are open.

While there have been described and illustrated several specific embodiments of the invention, it will be clear that variations in the details of the embodiments specifically illustrated and described may be made without departing from the true spirit and scope of the invention as defined in the appended claims.

What is claimed is:

1. Apparatus for identifying a number of layers of a thin, flexible web material wound on a reel as the reel is rotated, said web having a thickness $t$, comprising first pulse generating means synchronized with the rotation of said reel to generate one pulse upon each revolution of said reel; second pulse generating means synchronized to movement of segments of said web relative to said reel for generating one pulse per segment, each of said segments having a length $2\pi t$ along the length of said web and each layer of said web on said reel having a $2\pi t$ length difference from the previous adjacent web layer; said second pulse generating means further synchronized with said segments of said web to generate a difference of one pulse upon each additional revolution of said reel; and means for receiving said pulses from said first and second pulse generating means and converting said pulses to a signal identifying said number of layers.

2. The apparatus of claim 1 including means for normalizing the output of said layer number identifying means with respect to the circumference of a hub of said reel.

3. The apparatus of claim 2 wherein said normalizing means includes means for subtracting a fixed web layer number having an outer circumference corresponding to the circumference of said hub from a number of pulses associated with a web layer generated by said second pulse generating means.

4. The apparatus of claim 1 including means for receiving said pulse from said first and second pulse generating means and converting said pulses to a signal identifying a position of said web within a layer thereof.

5. The apparatus of claim 4 including means responsive to said layer number identifying signal and said web position identifying signal for controlling movement of said web to a predetermined layer number and position.

6. The apparatus of claim 1 wherein said second pulse generating means includes a code wheel arranged to rotate with movement of said web, markings on the periphery of said code wheel being spaced apart from each other at a distance $2\pi t$, and means for converting the markings to electrical pulses as said code wheel is rotated by said web.

7. The apparatus of claim 1 wherein said second pulse generating means includes markings recorded on said web, said markings spaced apart from each other at a distance $2\pi t$, and means for converting the markings to electrical pulses in response to movement of said web.

8. The apparatus of claim 1 including means responsive to said layer number identifying signal for controlling movement of said web to a predetermined layer number.

9. Apparatus for identifying a number of layers of a thin, flexible web material having a thickness t wound on a reel having a hub, said web being moved to and from said reel as the reel is rotated comprising a first pulse generator for generating first pulses synchronized with the rotation of said reel to generate one of said first pulses for each complete turn of said reel; a second pulse generator for generating second pulses synchronized to equal segments of said web, one of said second pulses generated for each of said segments, each of said segments having a length $2\pi t$ along the length of said web and each layer of said web on said reel having a $2\pi t$ length difference from the previous adjacent web layer; said second pulse generator further synchronized with said segments of said web to generate a difference of one pulse upon each additional turn of said reel; means responsive to said first pulses for counting a number of said second pulses generated during a complete turn of said reel; means for subtracting an indication representing a fixed web layer number having an outer circumference corresponding to the circumference of said hub from said counted number to form a signal representing a resultant number identifying a layer; and means for storing said signal representing the resultant number.

10. The apparatus of claim 9 including means for displaying said resultant number.

11. The apparatus of claim 9 including means responsive to said resultant number for controlling movement of the web to address a predetermined layer of said web.

12. The apparatus of claim 9 including means responsive to said first and second pulses for generating a signal corresponding to a position of said web within a layer thereof.

13. The apparatus of claim 12 including means responsive to said resultant number and said position signal for controlling movement of the web to address a predetermined position in a predetermined layer of said web.

14. Method of identifying a number of layers of a thin, flexible web material having a thickness $t$ wound on a reel comprising the steps of generating first pulses synchronized with the rotations of said reel to generate one of said first pulses upon each revolution of said reel; generating second pulses synchronized to equal length segments of the web, one of said second pulses generated for each of said segment lengths, each of the segments having a length $2\pi t$ along the length of the web, each layer of said web on said reel having a $2\pi t$ length difference from the previous adjacent web layer and for any one revolution of said reel the number of said second pulses generated differing by one from the number of said second pulses generated during the immediate preceeding revolution; subtracting a fixed web layer number from a number of the second pulses corresponding to a pair of successive first pulses, said fixed web layer number having an outer circumference corresponding to a circumference of a hub of the reel; and storing the result of said step of subtracting, said result being a layer number of the web.

15. The method of claim 14 including the step of monitoring the second pulses to provide an indication of position of the web within a layer thereof.

16. The apparatus of claim 1 wherein said second pulse generating means generates one additional pulse for each additional revolution of said reel when said web material winds upon said reel.

17. The apparatus of claim 1 wherein said second pulse generating means generates one less pulse for each additional revolution of said reel when said web material unwinds from said reel.

* * * * *